US007809145B2

(12) United States Patent
Mao

(10) Patent No.: US 7,809,145 B2
(45) Date of Patent: Oct. 5, 2010

(54) ULTRA SMALL MICROPHONE ARRAY

(75) Inventor: Xiadong Mao, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 653 days.

(21) Appl. No.: 11/381,729

(22) Filed: May 4, 2006

(65) Prior Publication Data

US 2007/0260340 A1 Nov. 8, 2007

(51) Int. Cl.
*H04R 3/00* (2006.01)
*H04B 15/00* (2006.01)

(52) U.S. Cl. .......................... 381/92; 381/122; 702/196

(58) Field of Classification Search ......... 702/190–195, 702/196; 704/233, 236; 381/94.1, 66, 92, 381/122, 91, 95, 97, 98, 356; 700/94
See application file for complete search history.

(56) References Cited

U.S. PATENT DOCUMENTS

| | | | | |
|---|---|---|---|---|
| 4,624,012 | A | 11/1986 | Lin et al. | |
| 5,113,449 | A | 5/1992 | Blanton et al. | |
| 5,214,615 | A | 5/1993 | Bauer | |
| 5,327,521 | A | 7/1994 | Savic et al. | |
| 5,335,011 | A | 8/1994 | Addeo et al. | 348/15 |
| 5,388,059 | A | 2/1995 | DeMenthon | |
| 5,425,130 | A | 6/1995 | Morgan | |
| 5,694,474 | A * | 12/1997 | Ngo et al. | 381/66 |
| 5,991,693 | A | 11/1999 | Zalewski | |

(Continued)

FOREIGN PATENT DOCUMENTS

| | | |
|---|---|---|
| EP | 0 652 686 | 5/1995 |
| EP | 1 489 596 | 12/2004 |

(Continued)

OTHER PUBLICATIONS

J. Benesty, "Adaptive eigenvalue decomposition algorithm for passive acoustic source localization," J. Acoust. Soc. Amer., vol. 107, No. 1, pp. 384-391, Jan. 2000.*

(Continued)

*Primary Examiner*—Vivian Chin
*Assistant Examiner*—Kile Blair
(74) *Attorney, Agent, or Firm*—Joshua D. Isenberg; JDI Patent

(57) ABSTRACT

Methods and apparatus for signal processing are disclosed. A discrete time domain input signal $x_m(t)$ may be produced from an array of microphones $M_0 \ldots M_M$. A listening direction may be determined for the microphone array. The listening direction is used in a semi-blind source separation to select the finite impulse response filter coefficients $b_0, b_1 \ldots, b_N$ to separate out different sound sources from input signal $x_m(t)$. One or more fractional delays may optionally be applied to selected input signals $x_m(t)$ other than an input signal $x_0(t)$ from a reference microphone $M_0$. Each fractional delay may be selected to optimize a signal to noise ratio of a discrete time domain output signal y(t) from the microphone array. The fractional delays may be selected to such that a signal from the reference microphone $M_0$ is first in time relative to signals from the other microphone(s) of the array. A fractional time delay Δ may optionally be introduced into an output signal y(t) so that: $y(t+\Delta)=x(t+\Delta)*b_0+x(t-1+\Delta)*b_1+x(t-2+\Delta)*b_2+ \ldots +x(t-N+\Delta)b_N$, where Δ is between zero and ±1.

29 Claims, 4 Drawing Sheets

U.S. PATENT DOCUMENTS

| | | | |
|---|---|---|---|
| 5,993,314 | A | 11/1999 | Dannenberg et al. |
| 6,002,776 | A * | 12/1999 | Bhadkamkar et al. ......... 381/66 |
| 6,009,396 | A * | 12/1999 | Nagata ....................... 704/270 |
| 6,014,623 | A | 1/2000 | Wu et al. |
| 6,081,780 | A | 6/2000 | Lumelsky |
| 6,115,684 | A | 9/2000 | Kawahara et al. |
| 6,144,367 | A | 11/2000 | Berstis |
| 6,173,059 | B1 | 1/2001 | Huang et al. .................. 381/92 |
| 6,317,703 | B1 * | 11/2001 | Linsker ...................... 702/190 |
| 6,332,028 | B1 | 12/2001 | Marash |
| 6,339,758 | B1 * | 1/2002 | Kanazawa et al. .......... 704/226 |
| 6,336,092 | B1 | 6/2002 | Gibson et al. |
| 6,618,073 | B1 | 9/2003 | Lambert et al. |
| 6,720,949 | B1 | 4/2004 | Fryor et al. |
| 6,931,362 | B2 * | 8/2005 | Beadle et al. ............... 702/190 |
| 6,934,397 | B2 * | 8/2005 | Madievski et al. ......... 381/94.1 |
| 7,035,415 | B2 | 4/2006 | Belt et al. |
| D571,367 | S | 5/2006 | Goto |
| D571,806 | S | 5/2006 | Goto |
| D572,254 | S | 5/2006 | Goto |
| 7,088,831 | B2 * | 8/2006 | Rosca et al. .................. 381/92 |
| 7,092,882 | B2 | 8/2006 | Arrowood et al. |
| 7,212,956 | B2 * | 5/2007 | Bruno et al. ................ 702/190 |
| 7,280,964 | B2 | 10/2007 | Wilson et al. |
| 2002/0048376 | A1 | 4/2002 | Ukita |
| 2002/0051119 | A1 | 5/2002 | Sherman et al. |
| 2002/0109680 | A1 | 8/2002 | Orbanes et al. |
| 2003/0046038 | A1 * | 3/2003 | Deligne et al. .............. 702/190 |
| 2003/0055646 | A1 | 3/2003 | Yoshioka et al. |
| 2003/0160862 | A1 | 8/2003 | Charlier et al. .......... 348/14.08 |
| 2003/0179891 | A1 | 9/2003 | Rabinowitz et al. |
| 2003/0193572 | A1 | 10/2003 | Wilson et al. |
| 2004/0046736 | A1 | 3/2004 | Pryor et al. |
| 2004/0047464 | A1 | 3/2004 | Yu et al. ................ 379/392.01 |
| 2004/0075677 | A1 | 4/2004 | Loyall et al. |
| 2004/0208497 | A1 | 10/2004 | Seger et al. |
| 2004/0213419 | A1 | 10/2004 | Varma et al. .................. 381/92 |
| 2005/0047611 | A1 | 3/2005 | Mao .......................... 381/94.7 |
| 2005/0059488 | A1 | 3/2005 | Larsen |
| 2005/0114126 | A1 | 5/2005 | Geiger et al. |
| 2005/0115103 | A1 | 6/2005 | Feng et al. |
| 2005/0115383 | A1 | 6/2005 | Chang |
| 2005/0226431 | A1 | 10/2005 | Mao ............................ 381/61 |
| 2006/0136213 | A1 | 6/2006 | Hirose et al. |
| 2006/0139322 | A1 | 6/2006 | Marks |
| 2006/0204012 | A1 | 9/2006 | Marks |
| 2006/0233389 | A1 | 10/2006 | Mao |
| 2006/0239471 | A1 | 10/2006 | Mao |
| 2006/0252474 | A1 | 11/2006 | Zalewski |
| 2006/0252475 | A1 | 11/2006 | Zalewski |
| 2006/0252477 | A1 | 11/2006 | Zalewski |
| 2006/0252541 | A1 | 11/2006 | Zalewski |
| 2006/0256081 | A1 | 11/2006 | Zalewski |
| 2006/0264258 | A1 | 11/2006 | Zalewski |
| 2006/0264259 | A1 | 11/2006 | Zalewski |
| 2006/0264260 | A1 | 11/2006 | Zalewski |
| 2006/0269072 | A1 | 11/2006 | Mao |
| 2006/0269073 | A1 | 11/2006 | Mao |
| 2006/0274032 | A1 | 12/2006 | Mao |
| 2006/0274911 | A1 | 12/2006 | Mao |
| 2006/0277571 | A1 | 12/2006 | Marks |
| 2006/0280312 | A1 | 12/2006 | Mao |
| 2006/0282873 | A1 | 12/2006 | Zalewski |
| 2006/0287084 | A1 | 12/2006 | Mao |
| 2006/0287085 | A1 | 12/2006 | Mao |
| 2006/0287086 | A1 | 12/2006 | Zalewski |
| 2006/0287087 | A1 | 12/2006 | Zalewski |
| 2007/0015558 | A1 | 1/2007 | Zalewski |
| 2007/0015559 | A1 | 1/2007 | Zalewski |
| 2007/0021208 | A1 | 1/2007 | Mao |
| 2007/0025562 | A1 | 2/2007 | Zalewski |
| 2007/0027687 | A1 | 2/2007 | Turk et al. |
| 2007/0061413 | A1 | 3/2007 | Larsen |
| 2007/0213987 | A1 | 9/2007 | Turk et al. |
| 2007/0223732 | A1 | 9/2007 | Mao |
| 2007/0233489 | A1 | 10/2007 | Hirose et al. |
| 2007/0250340 | A1 | 11/2007 | Mao |
| 2007/0258599 | A1 | 11/2007 | Mao |
| 2007/0260517 | A1 | 11/2007 | Zalewski |
| 2007/0261077 | A1 | 11/2007 | Zalewski |
| 2007/0265075 | A1 | 11/2007 | Zalewski |
| 2007/0274535 | A1 | 11/2007 | Mao |
| 2007/0298882 | A1 | 12/2007 | Marks |
| 2008/0096654 | A1 | 4/2008 | Mondesir |
| 2008/0096657 | A1 | 4/2008 | Benoist |
| 2008/0098448 | A1 | 4/2008 | Mondesir |
| 2008/0100825 | A1 | 5/2008 | Zalewski |
| 2008/0120115 | A1 | 5/2008 | Mao |
| 2009/0062943 | A1 | 3/2009 | Nason |

FOREIGN PATENT DOCUMENTS

| | | |
|---|---|---|
| JP | 03288898 A | 12/1991 |
| WO | WO 2004/073814 | 9/2004 |
| WO | WO 2004/073815 | 9/2004 |
| WO | 2006/121681 | 11/2006 |

OTHER PUBLICATIONS

U.S. Appl. No. 10/759,782, entitled "Method and Apparatus for Light Input Device", to Richard L. Mark, filed Jan. 16, 2004.

U.S. Appl. No. 11/429,414, entitled "Computer Image and Audio Processing of Intensity and Input Device When Interfacing With a Computer Program", to Richard L. Marks et al, filed May 4, 2006.

U.S. Appl. No. 11/381,725, entitled "Methods and Apparatus for Targeted Sound Detection", to Xiadong Mao, filed May 4, 2006.

U.S. Appl. No. 11/381,728, entitled "Echo and Noise Cancellation", to Xiadong Mao, filed May 4, 2006.

U.S. Appl. No. 11/381,727, entitled "Noise Removal for Electronic Device With Far Field Microphone on Console", to Xiadong Mao, filed May 4, 2006.

U.S. Appl. No. 11/381,724, entitled "Methods and Apparatus for Targeted Sound Detection and Characterization", to Xiadong Mao, filed May 4, 2006.

U.S. Appl. No. 11/418,988, entitled "Methods and Apparatuses for Adjusting a Listening Area for Capturing Sounds", to Xiadong Mao, filed May 4, 2006.

U.S. Appl. No. 11/418,989, entitled "Methods and Apparatuses for Capturing an Audio Signal Based on Visua Image", to Xiadong Mao, filed May 4, 2006.

U.S. Appl. No. 11/429,047, entitled "Methods and Apparatuses for Capturing an Audio Signal Based on a Location of the Signal", to Xiadong Mao, filed May 4, 2006.

U.S. Appl. No. 11/418,993, entitled "System and Method for Control by Audible Device", to Steven Osman, filed May 4, 2006.

U.S. Appl. No. 11/381,721, entitled "Selective Sound Source Listening in Conjunction With Computer Interactive Processing", to Xiadong Mao, filed May 4, 2006.

Mark Fiala et al., "A Panoramic Video and Acoustic Beamforming Sensor for Videoconferencing", IEEE, Oct. 2-3, 2004, pp. 47-52.

Kevin W. Wilson et al., "Audio-Video Array Source Localization for Intelligent Environments", IEEE 2002, vol. 2, pp. 2109-2112.

Y. Ephraim and D. Malah, "Speech enhancement using a minimum mean-square error short-time spectral amplitude estimator," *IEEE Trans. Acoust., Speech, Signal Processing*, vol. ASSP-32, pp. 1109-1121, Dec. 1984.

Y. Ephraim and D. Malah, "Speech enhancement using a minimum mean-square error log-spectral amplitude estimator," *IEEE Trans. Acoust., Speech, Signal Processing*, vol. ASSP-33, pp. 443-445, Apr. 1985.

Final Office Action for U.S. Appl. No. 11/381,725 dated Aug. 20, 2009.

Non-Final Office Action for U.S. Appl. No. 11/381,724 dated Aug. 19, 2009.

Non-Final Office Action for U.S. Appl. No. 11/382,256 dated Sep. 25, 2009.
U.S. Appl. No. 29/259,348 filed on May 6, 2006.
U.S. Appl. No. 29/259,349 filed on May 6, 2006.
U.S. Appl. No. 29/259,350 filed on May 6, 2006.
U.S. Appl. No. 60/789,031 Ned on May 6, 2006.
U.S. Appl. No. 60/718,145 filed on Sep. 15, 2005.
U.S. Appl. No. 60/678,413 filed on May 5, 2005.
U.S. Appl. No. 29/246,744 filed on May 5, 2005.
U.S. Appl. No. 29/246,762 filed on May 8, 2006.
U.S. Appl. No. 29/246,759 filed on May 8, 2006.
U.S. Appl. No. 29/246,763 filed on May 8, 2006.
U.S. Appl. No. 29/246,764 filed on May 8, 2006.
U.S. Appl. No. 29/246,765 filed on May 8, 2005.
U.S. Appl. No. 29/246,766 filed on May 8, 2006.
Patent Cooperation Treaty: "International Search Report" for PCT Application No. PCT/US2006/016670, which corresponds to U.S Pub. No. 2006-0204012; mailed Aug. 30, 2006; 2 Pages.
Patent Cooperation Treaty: "Written Opinion of the International Searching Authority" for PCT Application No. PCT/US2006/016670, which corresponds to U.S. Pub. No. 2006-0204012: mailed Aug. 30, 2006, 4 Pages.
Office Action issued in U.S. Appl. No. 11/418,989 mailed Jan. 5, 2010.
Notice of Allowance issued in U.S. Appl. No. 11/381,725 mailed Dec. 18, 2009.
Notice of Allowance issued in U.S. Appl. No. 11/381,724 mailed Feb. 5, 2010.
Office Action dated Mar. 2, 2010 issued for U.S. Appl. No. 11/429,047.
Final Office Action dated Mar. 4, 2010 issued for U.S. Appl. No. 11/717,269.
Final Office Action dated Mar. 23, 2010 issued for U.S. Appl. No. 11/418,988.
Office Action dated Mar. 26, 2010 issued for U.S. Appl. No. 11/381,721.
Final Office Action issued in U.S. Appl. No. 11/418,989 mailed Jan. 27, 2009, 8 pages.
Office Action issued in U.S. Appl. No. 11/429,047 mailed Aug. 20, 2009, 9 pages.
Office Action issued on U.S. Appl. No. 11/600,938 mailed Nov. 5, 2009, 17 pages.
Final Office Action issued in U.S. Appl. No. 11/717,269 mailed Aug. 19, 2009, 9 pages.
Office Action issued in U.S. Appl. No. 11/418,988 mailed Sep. 21, 2009.
Advisory Action issued in U.S. Appl. No. 11/418,989 mailed Jun. 4, 2009, 3 pages.
Office Action issued in U.S. Appl. No. 11/418,989 mailed Jun. 12, 2009, 8 pages.
Office Action issued in U.S. Appl. No. 11/429,047 mailed Jan. 23, 2009, 10 Pages.
Office Action issued in U.S. Appl. No. 11/717,269 mailed Feb. 10, 2009, 8 Pages.
Advisory Action issued in U.S. Appl. No. 11/418,988 mailed Jul. 1, 2009.
Final Office Action issued in U.S. Appl. No. 11/418,988 mailed Feb. 23, 2009.
Office Action issued in U.S. Appl. No. 11/418,989 mailed Aug. 6, 2008, 9 Pages.
Office Action issued in U.S. Appl. No. 11/429,047 mailed Aug. 6, 2008, 9 Pages.
Office Action issued in U.S. Appl. No. 11/418,988 mailed Aug. 6, 2008.
Notice of Allowance and Fee(s) Due dated May 19, 2010 issued for U.S. Appl. No. 11/382,256.
Notice of Allowance and Fee(s) Due dated Apr. 2, 2010 issued for U.S. Appl. No. 11/381,725.

* cited by examiner

ULTRA SMALL MICROPHONE ARRAY

CROSS-REFERENCE TO RELATED APPLICATIONS

This application is related to commonly-assigned, co-pending application Ser. No. 11/381,728, to Xiao Dong Mao, entitled ECHO AND NOISE CANCELLATION, filed the same day as the present application, the entire disclosures of which are incorporated herein by reference. This application is also related to commonly-assigned, co-pending application Ser. No. 11/381,725, to Xiao Dong Mao, entitled "METHODS AND APPARATUS FOR TARGETED SOUND DETECTION", filed the same day as the present application, the entire disclosures of which are incorporated herein by reference. This application is also related to commonly-assigned, co-pending application Ser. No. 11/381, 727, to Xiao Dong Mao, entitled "NOISE REMOVAL FOR ELECTRONIC DEVICE WITH FAR FIELD MICROPHONE ON CONSOLE", filed the same day as the present application, the entire disclosures of which are incorporated herein by reference. This application is also related to commonly -assigned, co-pending application Ser. No. 11/381, 724, to Xiao Dong Mao, entitled "METHODS AND APPARATUS FOR TARGETED SOUND DETECTION AND CHARACTERIZATION", filed the same day as the present application, the entire disclosures of which are incorporated herein by reference. This application is also related to commonly-assigned, co-pending application Ser. No. 11/381, 721, to Xiao Dong Mao, entitled "SELECTIVE SOUND SOURCE LISTENING IN CONJUNCTION WITH COMPUTER INTERACTIVE PROCESSING", filed the same day as the present application, the entire disclosures of which are incorporated herein by reference. This application is also related to commonly-assigned, co-pending International Patent Application number PCT/US06/17483, to Xiao Dong Mao, entitled "SELECTIVE SOUND SOURCE LISTENING IN CONJUNCTION WITH COMPUTER INTERACTIVE PROCESSING", filed the same day as the present application, the entire disclosures of which are incorporated herein by reference. This application is also related to commonly-assigned, co-pending application Ser. No. 11/418, 988, to Xiao Dong Mao, entitled "METHODS AND APPARATUSES FOR ADJUSTING A LISTENING AREA FOR CAPTURING SOUNDS", filed the same day as the present application, the entire disclosures of which are incorporated herein by reference. This application is also related to commonly-assigned, co-pending application Ser. No. 11/418, 989, to Xiao Dong Mao, entitled "METHODS AND APPARATUSES FOR CAPTURING AN AUDIO SIGNAL BASED ON VISUAL IMAGE", filed the same day as the present application, the entire disclosures of which are incorporated herein by reference. This application is also related to commonly-assigned, co-pending application Ser. No. 11/429,047, to Xiao Dong Mao, entitled "METHODS AND APPARATUSES FOR CAPTURING AN AUDIO SIGNAL BASED ON A LOCATION OF THE SIGNAL", filed the same day as the present application, the entire disclosures of which are incorporated herein by reference.

FIELD OF THE INVENTION

Embodiments of the present invention are directed to audio signal processing and more particularly to processing of audio signals from microphone arrays.

BACKGROUND OF THE INVENTION

Microphone arrays are often used to provide beam-forming for either noise reduction or echo-position, or both, by detecting the sound source direction or location. A typical microphone array has two or more microphones in fixed positions relative to each other with adjacent microphones separated by a known geometry, e.g., a known distance and/or known layout of the microphones. Depending on the orientation of the array, a sound originating from a source remote from the microphone array can arrive at different microphones at different times. Differences in time of arrival at different microphones in the array can be used to derive information about the direction or location of the source. However, there is a practical lower limit to the spacing between adjacent microphones. Specifically, neighboring microphones 1 and 2 must be sufficiently spaced apart that the delay Δt between the arrival of signals $s_1$ and $s_2$ is greater than a minimum time delay that is related to the highest frequency in the dynamic range of the microphone. In generally, the microphones 1 and 2 must be separated by a distance of about half a wavelength of the highest frequency of interest. For digital signal processing, the delay Δt cannot be smaller than the sampling rate of the signal. The sampling rate is, in turn, limited by the highest frequency to which the microphones in the array will respond.

To achieve better sound resolution in a microphone array, one can increase the microphone spacing Δd or use microphones with a greater dynamic range (i.e. increased sampling rate). Unfortunately, increasing the distance between microphones may not be possible for certain devices, e.g., cell phones, personal digital assistants, video cameras, digital cameras and other hand-held devices. Improving the dynamic range typically means using more expensive microphones. Relatively inexpensive electronic condenser microphone (ECM) sensors can respond to frequencies up to about 16 kilohertz (kHz). This corresponds to a minimum Δt of about 6 microseconds. Given this limitation on the microphone response, neighboring microphones typically have to be about 4 centimeters (cm) apart. Thus, a linear array of 4 microphones takes up at least 12 cm. Such an array would take up much too large a space to be practical in many portable hand-held devices.

Thus, there is a need in the art, for microphone array technique that overcomes the above disadvantages.

SUMMARY OF THE INVENTION

Embodiments of the invention are directed to methods and apparatus for signal processing. In embodiments of the invention a discrete time domain input signal $x_m(t)$ may be produced from an array of microphones $M_0 \ldots M_M$. A listening direction may be determined for the microphone array. The listening direction is used in a semi-blind source separation to select the finite impulse response filter coefficients $b_0, b_1 \ldots, b_N$ to separate out different sound sources from input signal $x_m(t)$.

In certain embodiments, one or more fractional delays may optionally be applied to selected input signals $x_m(t)$ other than an input signal $x_0(t)$ from a reference microphone $M_0$. Each fractional delay may be selected to optimize a signal to noise ratio of a discrete time domain output signal y(t) from the microphone array. The fractional delays may be selected for anti-causality, i.e., selected such that a signal from the reference microphone $M_0$ is first in time relative to signals from the other microphone(s) of the array. In some embodiments, a fractional time delay Δ may optionally be introduced into an output signal y(t) so that: $y(t+\Delta)=x(t+\Delta)*b_0+x(t-1+\Delta)*b_1+x(t-2+\Delta)*b_2+ \ldots +x(t-N+\Delta)b_N$, where $\Delta$ is between zero and ±1.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1A:
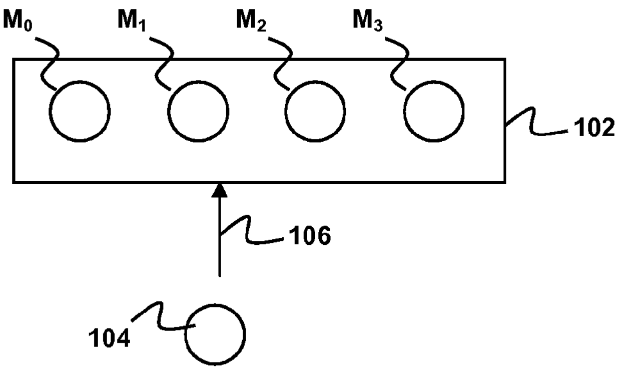
FIG. 1A is a schematic diagram of a microphone array illustrating determining of a listening direction according to an embodiment of the present invention.

As depicted in FIG. 1A, a microphone array 102 may include four microphones $M_0$, $M_1$, $M_2$, and $M_3$. In general, the microphones $M_0$, $M_1$, $M_2$, and $M_3$ may be omni-directional microphones, i.e., microphones that can detect sound from essentially any direction. Omni-directional microphones are generally simpler in construction and less expensive than microphones having a preferred listening direction. An audio signal 106 arriving at the microphone array 102 from one or more sources 104 may be expressed as a vector $x=[x_0, x_1, x_2, x_3]$, where $x_0$, $x_1$, $x_2$ and $x_3$ are the signals received by the microphones $M_0$, $M_1$, $M_2$ and $M_3$ respectively. Each signal $x_m$ generally includes subcomponents due to different sources of sounds. The subscript m range from 0 to 3 in this example and is used to distinguish among the different microphones in the array. The subcomponents may be expressed as a vector $s=[S_1, S_2, \ldots S_K]$, where K is the number of different sources. To separate out sounds from the signal s originating from different sources one must determine the best filter time delay of arrival (TDA) filter. For precise TDA detection, a state-of-art yet computationally intensive Blind Source Separation(BSS) is preferred theoretically. Blind source separation separates a set of signals into a set of other signals, such that the regularity of each resulting signal is maximized, and the regularity between the signals is minimized (i.e., statistical independence is maximized or decorrelation is minimized).

The blind source separation may involve an independent component analysis (ICA) that is based on second-order statistics. In such a case, the data for the signal arriving at each microphone may be represented by the random vector $x_m=[x_1, \ldots x_n]$ and the components as a random vector $s=[s_1, \ldots s_n]$ The task is to transform the observed data $x_m$, using a linear static transformation s=Wx, into maximally independent components s measured by some function $F(s_1, \ldots s_n)$ of independence.

The components $x_{mi}$ of the observed random vector $x_m=(x_{m1}, \ldots, x_{mn})$ are generated as a sum of the independent components $s_{mk}$, k=1, . . . , n, $x_{mi}=a_{mi1}s_{m1}+ \ldots +a_{mik}s_{mk}+ \ldots +a_{min}s_{mn}$, weighted by the mixing weights $a_{mik}$. In other words, the data vector $x_m$ can be written as the product of a mixing matrix A with the source vector $s^T$, i.e., $x_m=A\cdot s^T$ or $$\begin{bmatrix} x_{m1} \\ \vdots \\ x_{mn} \end{bmatrix} = \begin{bmatrix} a_{m11} & \cdots & a_{m1n} \\ \vdots & \cdots & \vdots \\ a_{mn1} & \cdots & a_{mnn} \end{bmatrix} \cdot \begin{bmatrix} s_1 \\ \vdots \\ s_n \end{bmatrix}$$

The original sources s can be recovered by multiplying the observed signal vector $x_m$ with the inverse of the mixing matrix $W=A^{-1}$, also known as the unmixing matrix. Determination of the unmixing matrix $A^{-1}$ may be computationally intensive. Embodiments of the invention use blind source separation (BSS) to determine a listening direction for the microphone array. The listening direction of the microphone array can be calibrated prior to run time (e.g., during design and/or manufacture of the microphone array) and re-calibrated at run time.

By way of example, the listening direction may be determined as follows. A user standing in a preferred listening direction with respect to the microphone array may record speech for about 10 to 30 seconds. The recording room should not contain transient interferences, such as competing speech, background music, etc. Pre-determined intervals, e.g., about every 8 milliseconds, of the recorded voice signal are formed into analysis frames, and transformed from the time domain into the frequency domain. Voice-Activity Detection (VAD) may be performed over each frequency-bin component in this frame. Only bins that contain strong voice signals are collected in each frame and used to estimate its $2^{nd}$-order statistics, for each frequency bin within the frame, i.e. a "Calibration Covariance Matrix" $Cal\_Cov(j,k)=E((X'_{jk})^T*X'_{jk})$, where E refers to the operation of determining the expectation value and $(X'_{jk})^T$ is the transpose of the vector $X'_{jk}$. The vector $X'_{jk}$ is a M+1 dimensional vector representing the Fourier transform of calibration signals for the $j^{th}$ frame and the $k^{th}$ frequency bin.

The accumulated covariance matrix then contains the strongest signal correlation that is emitted from the target listening direction. Each calibration covariance matrix Cal_Cov(j,k) may be decomposed by means of "Principal Component Analysis" (PCA) and its corresponding eigenmatrix C may be generated. The inverse $C^{-1}$ of the eigenmatrix C may thus be regarded as a "listening direction" that essentially contains the most information to de-correlate the covariance matrix, and is saved as a calibration result. As used herein, the term "eigenmatrix" of the calibration covariance matrix Cal_Cov(j,k) refers to a matrix having columns (or rows) that are the eigenvectors of the covariance matrix.

At run time, this inverse eigenmatrix $C^{-1}$ may be used to de-correlate the mixing matrix A by a simple linear transformation. After de-correlation, A is well approximated by its diagonal principal vector, thus the computation of the unmixing matrix (i.e., $A^{-1}$) is reduced to computing a linear vector inverse of:

$$A1=A*C^{-1}$$

A1 is the new transformed mixing matrix in independent component analysis (ICA). The principal vector is just the diagonal of the matrix A1.

Recalibration in runtime may follow the preceding steps. However, the default calibration in manufacture takes a very large amount of recording data (e.g., tens of hours of clean voices from hundreds of persons) to ensure an unbiased, person-independent statistical estimation. While the recalibration at runtime requires small amount of recording data from a particular person, the resulting estimation of $C^{-1}$ is thus biased and person-dependant.

As described above, a principal component analysis (PCA) may be used to determine eigenvalues that diagonalize the mixing matrix A. The prior knowledge of the listening direction allows the energy of the mixing matrix A to be compressed to its diagonal. This procedure, referred to herein as semi-blind source separation (SBSS) greatly simplifies the calculation the independent component vector $s^T$.

Figure 1B:
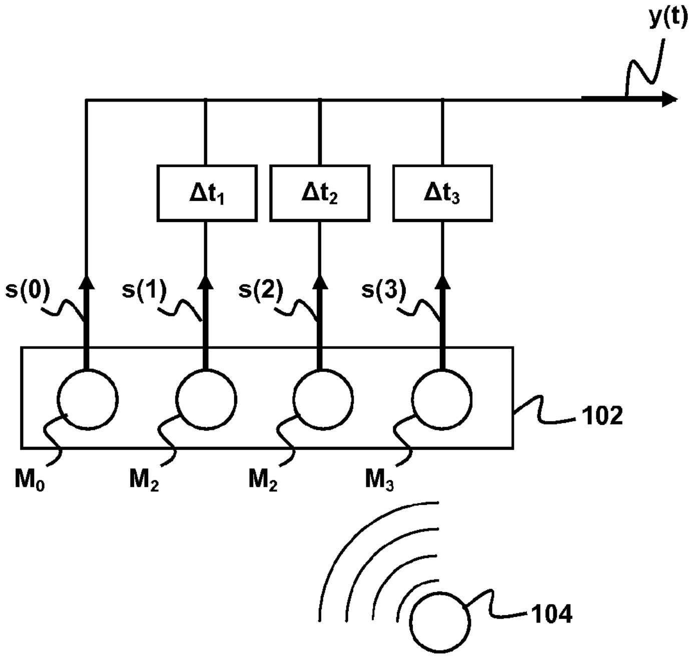
FIG. 1B is a schematic diagram of a microphone array illustrating anti-causal filtering according to an embodiment of the present invention.

Embodiments of the present invention may also make use of anti-causal filtering. The problem of causality is illustrated in FIG. 1B. In the microphone array 102 one microphone, e.g., $M_0$ is chosen as a reference microphone. In order for the signal x(t) from the microphone array to be causal, signals from the source 104 must arrive at the reference microphone $M_0$ first. However, if the signal arrives at any of the other microphones first, $M_0$ cannot be used as a reference microphone. Generally, the signal will arrive first at the microphone closest to the source 104. Embodiments of the present invention adjust for variations in the position of the source 104 by switching the reference microphone among the microphones $M_0$, $M_1$, $M_2$, $M_3$ in the array 102 so that the reference microphone always receives the signal first. Specifically, this anti-causality may be accomplished by artificially delaying the signals received at all the microphones in the array except for the reference microphone while minimizing the length of the delay filter used to accomplish this.

For example, if microphone $M_0$ is the reference microphone, the signals at the other three (non-reference) microphones $M_1$, $M_2$, $M_3$ may be adjusted by a fractional delay $\Delta t_m$, (m=1, 2, 3) based on the system output y(t). The fractional delay $\Delta t_m$ may be adjusted based on a change in the signal to noise ratio (SNR) of the system output y(t). Generally, the delay is chosen in a way that maximizes SNR. For example, in the case of a discrete time signal the delay for the signal from each non-reference microphone $\Delta t_m$ at time sample t may be calculated according to: $\Delta t_m(t)=\Delta t_m(t-1)+\mu\Delta SNR$, where ΔSNR is the change in SNR between t−2 and t−1 and μ is a pre-defined step size, which may be empirically determined. If Δt(t)>1 the delay has been increased by 1 sample. In embodiments of the invention using such delays for anti-causality, the total delay (i.e., the sum of the $\Delta t_m$) is typically 2-3 integer samples. This may be accomplished by use of 2-3 filter taps. This is a relatively small amount of delay when one considers that typical digital signal processors may use digital filters with up to 512 taps. It is noted that applying the artificial delays $\Delta t_m$ to the non-reference microphones is the digital equivalent of physically orienting the array 102 such that the reference microphone $M_0$ is closest to the sound source 104.

As described above, if prior art digital sampling is used, the distance d between neighboring microphones in the array 102 (e.g., microphones $M_0$ and $M_1$) must be about half a wavelength of the highest frequency of sound that the microphones can detect. For a discrete time system, however, embodiments of the present invention overcome this problem through the use of a fractional delay in a discrete time signal that is filtered using multiple filter taps.

Figure 2A:
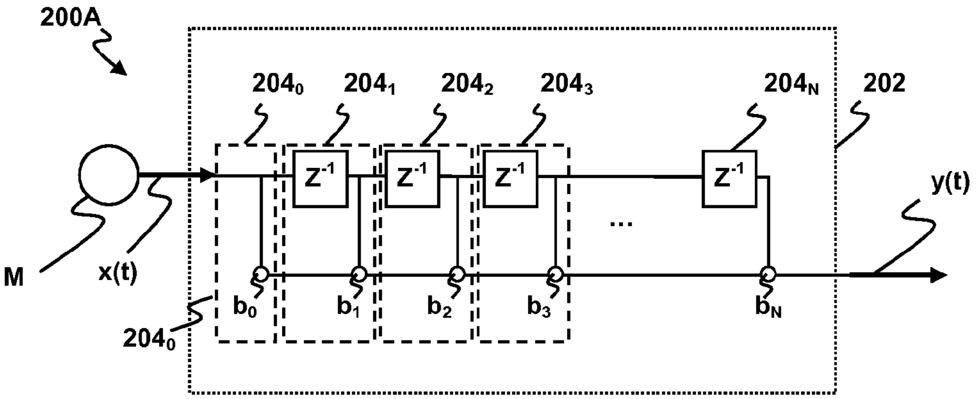
FIG. 2A is a schematic diagram of a microphone array and filter apparatus according to an embodiment of the present invention.

FIG. 2A illustrates filtering of a signal from one of the microphones $M_0$ in the array 102. In an apparatus 200A the signal from the microphone $x_0(t)$ is fed to a filter 202, which is made up of N+1 taps $\mathbf{204}_0 \ldots \mathbf{204}_N$. Except for the first tap $\mathbf{204}_0$ each tap $\mathbf{204}_1$ includes a delay section, represented by a z-transform $z^{-1}$ and a finite response filter. Each delay section introduces a unit integer delay to the signal x(t). The finite impulse response filters are represented by finite impulse response filter coefficients $b_0, b_1, b_2, b_3, \ldots b_N$. In embodiments of the invention, the filter 202 may be implemented in hardware or software or a combination of both hardware and software. An output y(t) from a given filter tap $\mathbf{204}_i$ is just the convolution of the input signal to filter tap $\mathbf{204}_i$ with the corresponding finite impulse response coefficient $b_i$. It is noted that for all filter taps $\mathbf{204}_i$ except for the first one $\mathbf{204}_0$ the input to the filter tap is just the output of the delay section $z^{-1}$ of the preceding filter tap $\mathbf{204}_{i-1}$. Thus, the output of the filter 202 may be represented by:

$y(t)=x(t)*b_0+x(t-1)*b_1+x(t-2)*b_2+\ldots+x(t-N)b_N$. Where the symbol "*" represents the convolution operation. Convolution between two discrete time functions f(t) and g(t) is defined as $$(f*g)(t)=\sum_n f(n)g(t-n).$$

The general problem in audio signal processing is to select the values of the finite impulse response filter coefficients $b_0, b_1, \ldots, b_N$ that best separate out different sources of sound from the signal y(t).

If the signals x(t) and y(t) are discrete time signals each delay $z^{-1}$ is necessarily an integer delay and the size of the delay is inversely related to the maximum frequency of the microphone. This ordinarily limits the resolution of the system 200A. A higher than normal resolution may be obtained if it is possible to introduce a fractional time delay Δ into the signal y(t) so that:

$$y(t+\Delta)=x(t+\Delta)*b_0+x(t-1+\Delta)*b_1+x(t-2+\Delta)*b_2+\ldots+x(t-N+\Delta)b_N,$$

where Δ is between zero and ±1. In embodiments of the present invention, a fractional delay, or its equivalent, may be obtained as follows. First, the signal x(t) is delayed by j samples.

each of the finite impulse response filter coefficients $b_i$ (where i=0, 1, . . . N) may be represented as a (J+1)-dimensional column vector $$b_i=\begin{bmatrix} b_{i0} \\ b_{i1} \\ \vdots \\ b_{iJ} \end{bmatrix}$$

and y(t) may be rewritten as:

$$y(t) = \begin{bmatrix} x(t) \\ x(t-1) \\ \vdots \\ x(t-J) \end{bmatrix}^T * \begin{bmatrix} b_{00} \\ b_{01} \\ \vdots \\ b_{0j} \end{bmatrix} + \begin{bmatrix} x(t-1) \\ x(t-2) \\ \vdots \\ x(t-J-1) \end{bmatrix}^T * \begin{bmatrix} b_{10} \\ b_{11} \\ \vdots \\ b_{1J} \end{bmatrix} + \cdots + \begin{bmatrix} x(t-N-J) \\ x(t-N-J+1) \\ \vdots \\ x(t-N) \end{bmatrix}^T * \begin{bmatrix} b_{N0} \\ b_{N1} \\ \vdots \\ b_{NJ} \end{bmatrix}$$

When y(t) is represented in the form shown above one can interpolate the value of y(t) for any fractional value of t=t+Δ. Specifically, three values of y(t) can be used in a polynomial interpolation. The expected statistical precision of the fractional value Δ is inversely proportional to J+1, which is the number of "rows" in the immediately preceding expression for y(t).

In embodiments of the present invention, the quantity t+Δ may be regarded as a mathematical abstract to explain the idea in time-domain. In practice, one need not estimate the exact "t+Δ". Instead, the signal y(t) may be transformed into the frequency-domain, so there is no such explicit "t+Δ". Instead an estimation of a frequency-domain function $F(b_i)$ is sufficient to provide the equivalent of a fractional delay Δ. The above equation for the time domain output signal y(t) may be transformed from the time domain to the frequency domain, e.g., by taking a Fourier transform, and the resulting equation may be solved for the frequency domain output signal Y(k). This is equivalent to performing a Fourier transform (e.g., with a fast Fourier transform (fft)) for J+1 frames where each frequency bin in the Fourier transform is a (J+1)x1 column vector. The number of frequency bins is equal to N+1.

The finite impulse response filter coefficients $b_{ij}$ for each row of the equation above may be determined by taking a Fourier transform of x(t) and determining the $b_{ij}$ through semi-blind source separation. Specifically, for each "row" of the above equation becomes:

$$X_0=FT(x(t, t-1, \ldots, t-N))=[X_{00}, X_{01}, \ldots, X_{ON}]$$

$$X_1=FT(x(t-1, t-2, \ldots, t-(N+1))=[X_{10}, X_{11}, \ldots, X_{1N}]$$

$X_J=FT(x(t, t-1, \ldots, t-(N+J)))=[X_{J0}, X_{J1}, \ldots, X_{JN}]$, where FT( ) represents the operation of taking the Fourier transform of the quantity in parentheses.

Figure 2B:
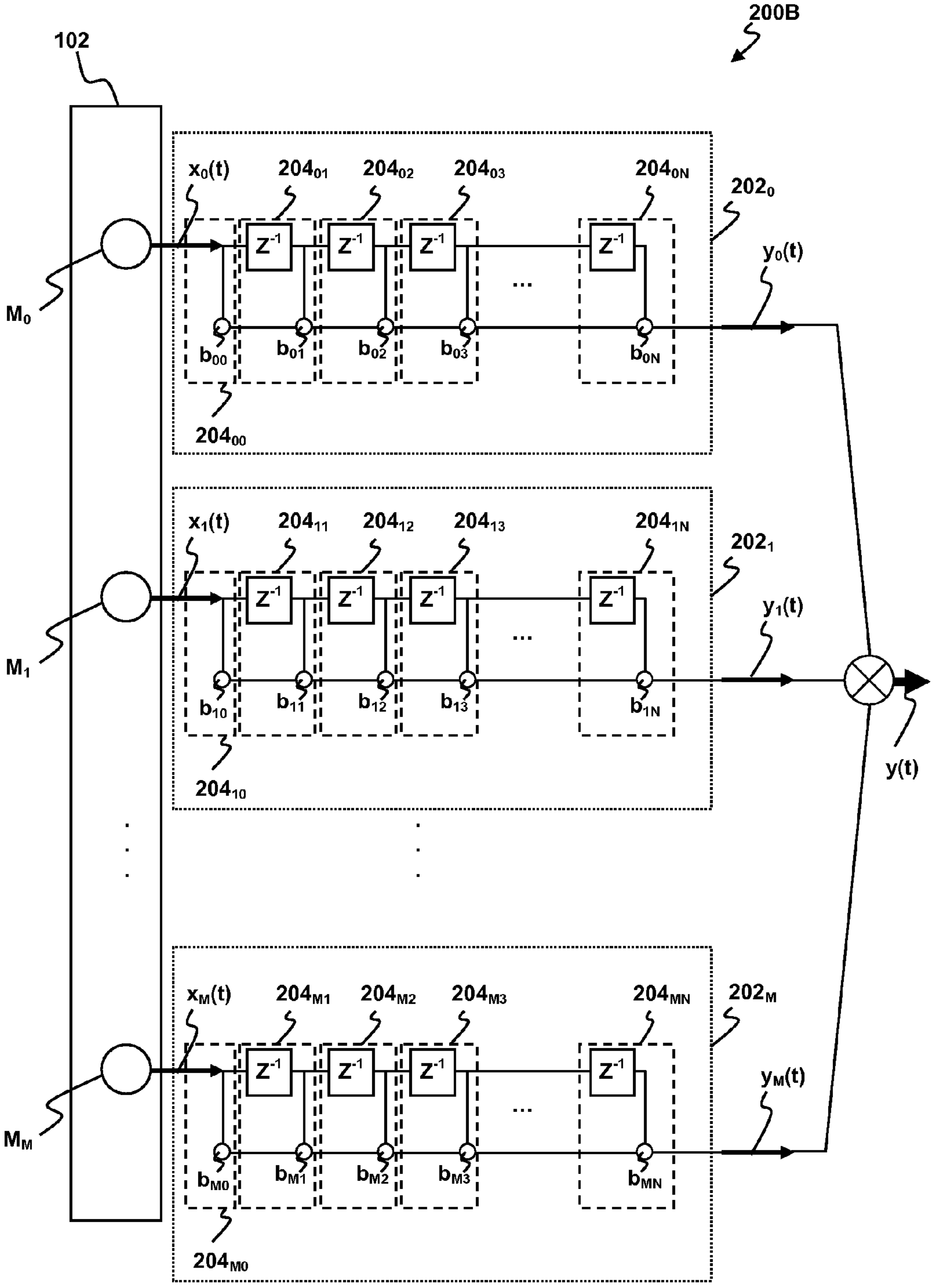
FIG. 2B is a schematic diagram of a microphone array and filter apparatus according to an alternative embodiment of the present invention.

Furthermore, although the preceding deals with only a single microphone, embodiments of the invention may use arrays of two or more microphones. In such cases the input signal x(t) may be represented as an M+1-dimensional vector: $x(t)=(x_0(t), x_1(t), \ldots, x_M(t))$, where M+1 is the number of microphones in the array. FIG. 2B depicts an apparatus 200B having microphone array 102 of M+1 microphones $M_0$, $M_1 \ldots M_M$. Each microphone is connected to one of M+1 corresponding filters $\mathbf{202}_0, \mathbf{202}_1, \ldots, \mathbf{202}_M$. Each of the filters $\mathbf{202}_0, \mathbf{202}_1, \ldots, \mathbf{202}_M$ includes a corresponding set of N+1 filter taps $\mathbf{204}_{00}, \ldots, \mathbf{204}_{0N}, \mathbf{204}_{10}, \ldots, \mathbf{204}_{1N}, \mathbf{204}_{M0}, \ldots, \mathbf{204}_{MN}$. Each filter tap 204 ml includes a finite impulse response filter $b_{mi}$, where m=0 . . . M, i=0 . . . N. Except for the first filter tap $\mathbf{204}_{m0}$ in each filter $\mathbf{202}_m$, the filter taps also include delays indicated by $Z^{-1}$. Each filter $\mathbf{202}_m$ produces a corresponding output $y_m(t)$, which may be regarded as the components of the combined output y(t) of the filters. Fractional delays may be applied to each of the output signals $y_m(t)$ as described above.

For an array having M+1 microphones, the quantities $X_j$ are generally (M+1)-dimensional vectors. By way of example, for a 4-channel microphone array, there are 4 input signals: $x_0(t)$, $x_1(t)$, $x_2(t)$, and $x_3(t)$. The 4-channel inputs $x_m(t)$ are transformed to the frequency domain, and collected as a 1×4 vector "$X_{jk}$". The outer product of the vector $X_{jk}$ becomes a 4×4 matrix, the statistical average of this matrix becomes a "Covariance" matrix, which shows the correlation between every vector element.

By way of example, the four input signals $x_0(t)$, $x_1(t)$, $x_2(t)$ and $x_3(t)$ may be transformed into the frequency domain with J+1=10 blocks. Specifically:

For channel 0:

$$X_{00}=FT([x_0(t-0), x_0(t-1), x_0(t-2), \ldots x_0(t-N-1+0)])$$

$$X_{01}=FT([x_0(t-1), x_0(t-2), x_0(t-3), \ldots x_0(t-N-1+1)])$$

$$\ldots$$

$$X_{09}=FT([x_0(t-9), x_0(t-10)x_0(t-2), x_0(t-N-1+10)])$$

For channel 1:

$$X_{01}=FT([x_1(t-0), x_1(t-1), x_1(t-2), \ldots x_1(t-N-1+0)])$$

$$X_{11}=FT([x_1(t-1), x_1(t-2), x_1(t-3), \ldots x_1(t-N-1+1])$$

$$\ldots$$

$$x_{19}=FT([x_1(t-9), x_1(t-10)x_1(t-2), \ldots x_1(t-N-1+10])$$

For channel 2:

$$X_{20}=FT([x_2(t-0), x_2(t-1), x_2(t-2), \ldots x_2(t-N-1+0])$$

$$X_{21}=FT([x_2(t-1), x_2(t-2), x_2(t-3), \ldots x_2(t-N-1+1])$$

$$\ldots$$

$$X_{29}=FT([x_2(t-9), x_2(t-10)x_2(t-2), \ldots x_2(t-N-1+10])$$

For channel 3:

$$X_{30}=FT([x_3(t-0), x_3(t-1), x_3(t-2), \ldots x_3(t-N-1+0])$$

$$X_{31}=FT([x_3(t-1), x_3(t-2), x_3(t-3), \ldots x_3(t-N-1+1)])$$

$$\ldots$$

$$X_{39}=FT([x_3(t-9), x_3(t-10)\ x_3(t-2), \ldots x_3(t-N-1+10)])$$

By way of example 10 frames may be used to construct a fractional delay. For every frame j, where j=0:9, for every frequency bin <k>, where n=0: N−1, one can construct a 1×4 vector:

$$X_{jk}=[X_{0j}(k), X_{1j}(k), X_{2j}(k), X_{3j}(k)]$$

the vector $X_{jk}$ is fed into the SBSS algorithm to find the filter coefficients $b_{jn}$. The SBSS algorithm is an independent component analysis (ICA) based on $2^{nd}$-order independence, but the mixing matrix A (e.g., a 4×4 matrix for 4-mic-array) is replaced with 4×1 mixing weight vector $b_{jk}$, which is a diagonal of $A1=A*C^{-1}$ (i.e., $b_{jk}$=Diagonal (A1)), where $C^{-1}$ is the inverse eigenmatrix obtained from the calibration procedure described above. It is noted that the frequency domain calibration signal vectors $X'_{jk}$ may be generated as described in the preceding discussion.

The mixing matrix A may be approximated by a runtime covariance matrix $Cov(j,k)=E((X_{jk})^T*X_{jk})$, where E refers to the operation of determining the expectation value and $(X_{jk})^T$ is the transpose of the vector $X_{jk}$. The components of each vector $b_{jk}$ are the corresponding filter coefficients for each frame j and each frequency bin k, i.e., $$b_{jk}=[b_{0j}(k), b_{1j}(k), b_{2j}(k), b_{3j}(k)].$$

The independent frequency-domain components of the individual sound sources making up each vector $X_{jk}$ may be determined from:

$$S(j,k)^T=b_{jk}^{-1}\cdot X_{jk}=[(b_{0j}(k))^{-1}X_{0j}(k), (b_{1j}(k))^{-1}X_{1j}(k), (b_{2j}(k))^{-1}X_{2j}(k), (b_{3j}(k))^{-1}X_{3j}(k)]$$

where each $S(j,k)^T$ is a 1×4 vector containing the independent frequency-domain components of the original input signal x(t).

The ICA algorithm is based on "Covariance" independence, in the microphone array 102. It is assumed that there are always M+1 independent components (sound sources) and that their 2nd-order statistics are independent. In other words, the cross-correlations between the signals $x_0(t)$, $x_1(t)$, $x_2(t)$ and $x_3(t)$ should be zero. As a result, the non-diagonal elements in the covariance matrix Cov(j,k) should be zero as well.

By contrast, if one considers the problem inversely, if it is known that there are M+1 signal sources one can also determine their cross-correlation "covariance matrix", by finding a matrix A that can de-correlate the cross-correlation, i.e., the matrix A can make the covariance matrix Cov(j,k) diagonal (all non-diagonal elements equal to zero), then A is the "unmixing matrix" that holds the recipe to separate out the 4 sources.

Because solving for "unmixing matrix A" is an "inverse problem", it is actually very complicated, and there is normally no deterministic mathematical solution for A. Instead an initial guess of A is made, then for each signal vector $x_m(t)$ (m=0, 1 . . . M), A is adaptively updated in small amounts (called adaptation step size). In the case of a four-microphone array, the adaptation of A normally involves determining the inverse of a 4×4 matrix in the original ICA algorithm. Hopefully, adapted A will converge toward the true A. According to embodiments of the present invention, through the use of semi-blind-source-separation, the unmixing matrix A becomes a vector A1, since it is has already been decorrelated by the inverse eigenmatrix $C^{-1}$ which is the result of the prior calibration described above.

Multiplying the run-time covariance matrix Cov(j,k) with the pre-calibrated inverse eigenmatrix $C^{-1}$ essentially picks up the diagonal elements of A and makes them into a vector A1. Each element of A1 is the strongest-cross-correlation, the inverse of A will essentially remove this correlation. Thus, embodiments of the present invention simplify the conventional ICA adaptation procedure, in each update, the inverse of A becomes a vector inverse $b^{-1}$. It is noted that computing a matrix inverse has N-cubic complexity, while computing a vector inverse has N-linear complexity. Specifically, for the case of N=4, the matrix inverse computation requires 64times more computation that the vector inverse computation.

Also, by cutting a (M+1)×(M+1) matrix to a (M+1)×1 vector, the adaptation becomes much more robust, because it requires much fewer parameters and has considerably less problems with numeric stability, referred to mathematically as "degree of freedom". Since SBSS reduces the number of degrees of freedom by (M+1) times, the adaptation convergence becomes faster. This is highly desirable since, in real world acoustic environment, sound sources keep changing, i.e., the unmixing matrix A changes very fast. The adaptation of A has to be fast enough to track this change and converge to its true value in real-time. If instead of SBSS one uses a conventional ICA-based BSS algorithm, it is almost impossible to build a real-time application with an array of more than two microphones. Although some simple microphone arrays that use BSS, most, if not all, use only two microphones, and no 4 microphone array truly BSS system can run in real-time on presently available computing platforms.

The frequency domain output Y(k) may be expressed as an N+1 dimensional vector $Y=[Y_0, Y_1, \ldots, Y_N]$, where each component $Y_i$ may be calculated by:

$$Y_i = [\,X_{i0} \quad X_{i1} \quad \cdots \quad X_{iJ}\,]\cdot\begin{bmatrix} b_{i0} \\ b_{i1} \\ \vdots \\ b_{iJ} \end{bmatrix}$$

Each component $Y_i$ may be normalized to achieve a unit response for the filters.

$$Y_i' = \frac{Y_i}{\sqrt{\sum_{j=0}^{J} (b_{ij})^2}}$$

Although in embodiments of the invention N and J may take on any values, it has been shown in practice that N=511 and J=9 provides a desirable level of resolution, e.g., about 1/10 of a wavelength for an array containing 16 kHz microphones.

Figure 3:
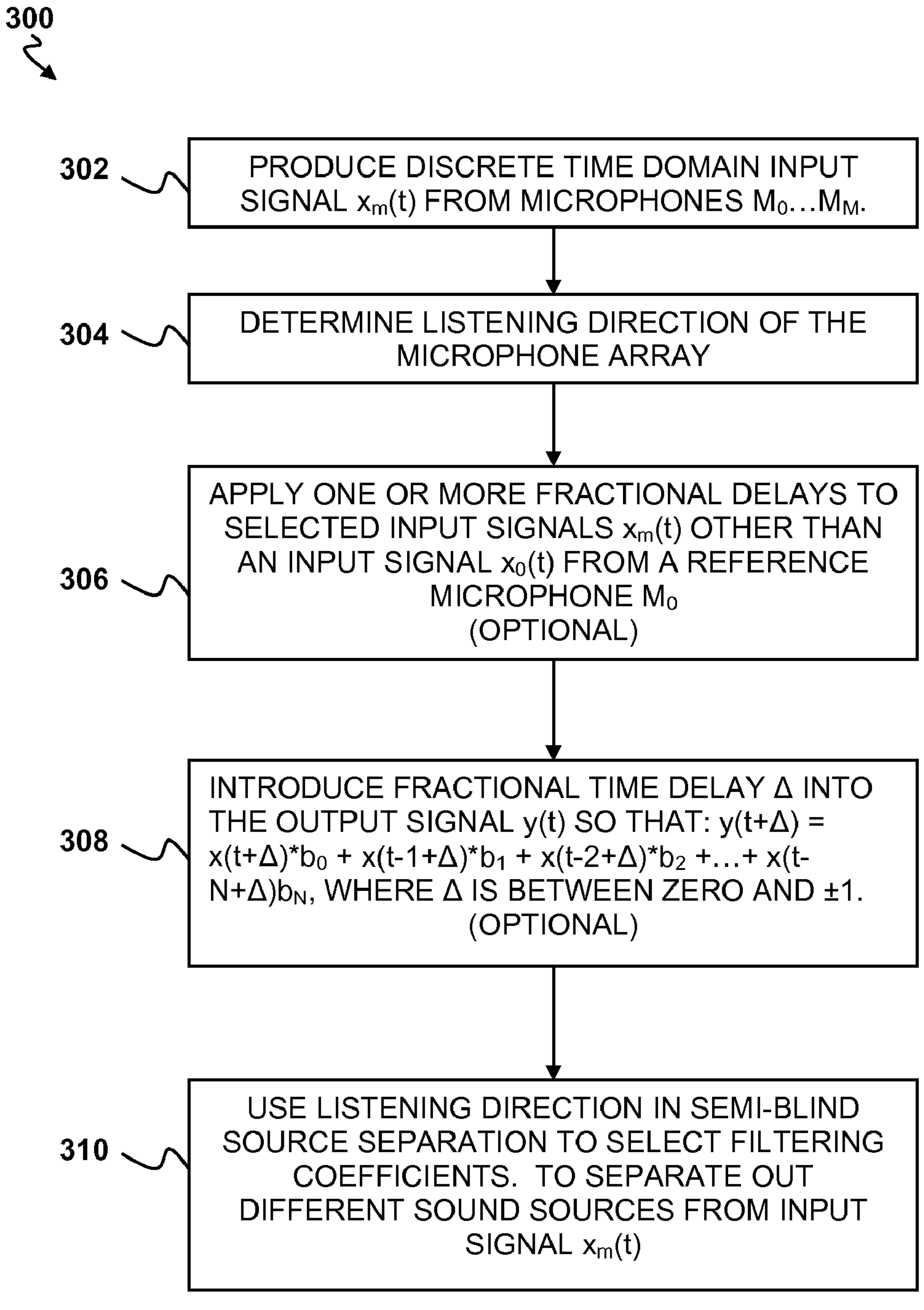
FIG. 3 is a flow diagram of a method for processing a signal from an array of two or more microphones according to an embodiment of the present invention.

According to alternative embodiments of the invention one may implement signal processing methods that utilize various combinations of the above-described concepts. For example, FIG. 3 depicts a flow diagram of a method 300 according to such an embodiment of the invention. In the method 300 a discrete time domain input signal $x_m(t)$ may be produced from microphones $M_0 \ldots M_M$ as indicated at 302. A listening direction may be determined for the microphone array as indicated at 304, e.g., by computing an inverse eigenmatrix $C^{-1}$ for a calibration covariance matrix as described above. As discussed above, the listening direction may be determined during calibration of the microphone array during design or manufacture or may be re-calibrated at runtime. Specifically, a signal from a source located in a preferred listening direction with respect to the microphone array may be recorded for a predetermined period of time. Analysis frames of the signal may be formed at predetermined intervals and the analysis frames may be transformed into the frequency domain. A calibration covariance matrix may be estimated from a vector of the analysis frames that have been transformed into the frequency domain. An eigenmatrix C of the calibration covariance matrix may be computed and an inverse of the eigenmatrix provides the listening direction.

At 306, one or more fractional delays may optionally be applied to selected input signals $x_m(t)$ other than an input signal $x_0(t)$ from a reference microphone $M_0$. Each fractional delay is selected to optimize a signal to noise ratio of a discrete time domain output signal y(t) from the microphone array. The fractional delays are selected to such that a signal from the reference microphone $M_0$ is first in time relative to signals from the other microphone(s) of the array. At 308 a fractional time delay Δ may optionally be introduced into the output signal y(t) so that: $y(t+\Delta)=x(t+\Delta)*b_0+x(t-1+\Delta)*b_1+x(t-2+\Delta)*b_2+\ldots+x(t-N+\Delta)b_N$, where A is between zero and ±1. The fractional delay may be introduced as described above with respect to FIGS. 2A-2B. Specifically, each time domain input signal $x_m(t)$ may be delayed by j+1 frames and the resulting delayed input signals may be transformed to a frequency domain to produce a frequency domain input signal vector $X_{jk}$ for each of k=0:N frequency bins.

At 310 the listening direction (e.g., the inverse eigenmatrix $C^{-1}$) determined at 304 is used in a semi-blind source separation to select the finite impulse response filter coefficients $b_0, b_1 \ldots, b_N$ to separate out different sound sources from input signal $x_m(t)$. Specifically, filter coefficients for each microphone m, each frame j and each frequency bin k, $[b_{0j}(k), b_{1j}(k), \ldots b_{Mj}(k)]$ may be computed that best separate out two or more sources of sound from the input signals $x_m(t)$. Specifically, a runtime covariance matrix may be generated from each frequency domain input signal vector $X_{jk}$. The runtime covariance matrix may be multiplied by the inverse $C^{-1}$ of the eigenmatrix C to produce a mixing matrix A and a mixing vector may be obtained from a diagonal of the mixing matrix A. The values of filter coefficients may be determined from one or more components of the mixing vector.

Figure 4:
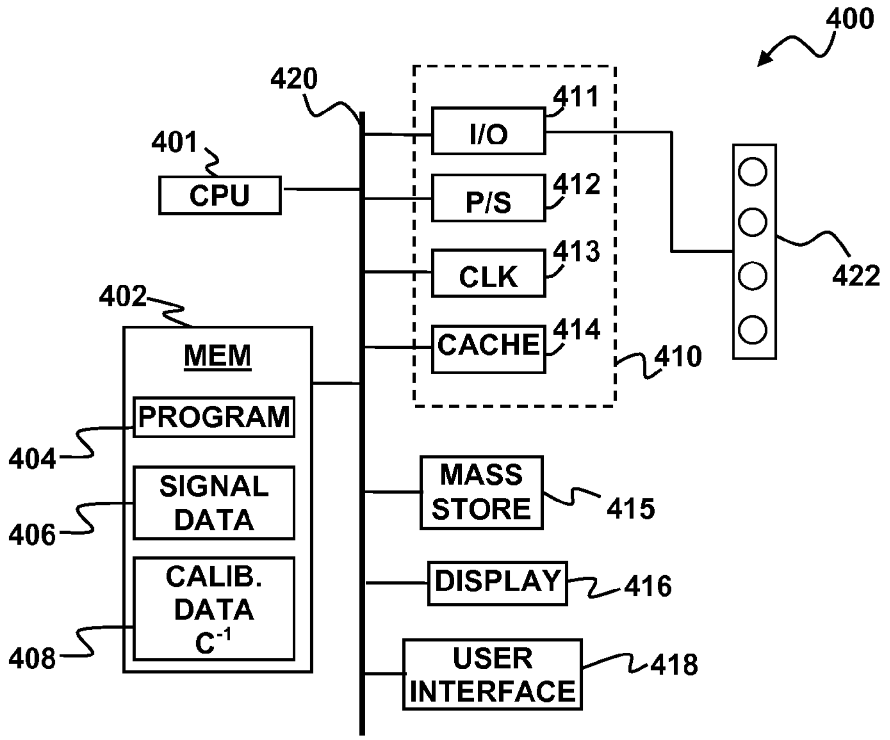
FIG. 4 is a block diagram illustrating a signal processing apparatus according to an embodiment of the present invention.

According to embodiments of the present invention, a signal processing method of the type described above with respect to FIGS. 1A-1B, 2A-2B, 3 operating as described above may be implemented as part of a signal processing apparatus 400, as depicted in FIG. 4. The apparatus 400 may include a processor 401 and a memory 402 (e.g., RAM, DRAM, ROM, and the like). In addition, the signal processing apparatus 400 may have multiple processors 401 if parallel processing is to be implemented. The memory 402 includes data and code configured as described above. Specifically, the memory 402 may include signal data 406 which may include a digital representation of the input signals $x_m(t)$, and code and/or data implementing the filters $\mathbf{202}_0 \ldots \mathbf{202}_M$ with their corresponding filter taps $\mathbf{204}_{mi}$ with delays $z^{-1}$ and finite impulse response filter coefficients $b_{mi}$ as described above. The memory 402 may also contain calibration data 408, e.g., data representing the inverse eigenmatrix $C^{-1}$ obtained from calibration of a microphone array 422 as described above.

The apparatus 400 may also include well-known support functions 410, such as input/output (I/O) elements 411, power supplies (P/S) 412, a clock (CLK) 413 and cache 414. The apparatus 400 may optionally include a mass storage device 415 such as a disk drive, CD-ROM drive, tape drive, or the like to store programs and/or data. The controller may also optionally include a display unit 416 and user interface unit 418 to facilitate interaction between the controller 400 and a user. The display unit 416 may be in the form of a cathode ray tube (CRT) or flat panel screen that displays text, numerals, graphical symbols or images. The user interface 418 may include a keyboard, mouse, joystick, light pen or other device. In addition, the user interface 418 may include a microphone, video camera or other signal transducing device to provide for direct capture of a signal to be analyzed. The processor 401, memory 402 and other components of the system 400 may exchange signals (e.g., code instructions and data) with each other via a system bus 420 as shown in FIG. 4.

A microphone array 422 may be coupled to the apparatus 400 through the I/O functions 411. The microphone array may include between about 2 and about 8 microphones, preferably about 4 microphones with neighboring microphones separated by a distance of less than about 4 centimeters, preferably between about 1 centimeter and about 2 centimeters. Preferably, the microphones in the array 422 are omnidirectional microphones.

As used herein, the term I/O generally refers to any program, operation or device that transfers data to or from the system 400 and to or from a peripheral device. Every data transfer may be regarded as an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, microphone, game controller, camera, external Zip drive or scanner as well as internal devices, such as a CD-ROM drive, CD-R drive or internal modem or other peripheral such as a flash memory reader/writer, hard drive.

The processor 401 may perform digital signal processing on signal data 406 as described above in response to the data 406 and program code instructions of a program 404 stored and retrieved by the memory 402 and executed by the processor module 401. Code portions of the program 404 may conform to any one of a number of different programming languages such as Assembly, C++, JAVA or a number of other languages. The processor module 401 forms a general-purpose computer that becomes a specific purpose computer when executing programs such as the program code 404. Although the program code 404 is described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both.

In one embodiment, among others, the program code 404 may include a set of processor readable instructions that implement a method having features in common with the method 300 of FIG. 3. The program code 404 may generally include one or more instructions that direct the one or more processors to produce a discrete time domain input signal $x_m(t)$ from the microphones $M_0 \ldots M_M$, determine listening direction, and use the listening direction in a semi-blind source separation to select the finite impulse response filter coefficients to separate out different sound sources from input signal $x_m(t)$. The program 404 may also include instructions to apply one or more fractional delays to selected input signals $x_m(t)$ other than an input signal $x_0(t)$ from a reference microphone $M_0$. Each fractional delay may be selected to optimize a signal to noise ratio of a discrete time domain output signal y(t) from the microphone array. The fractional delays may be selected to such that a signal from the reference microphone $M_0$ is first in time relative to signals from the other microphone(s) of the array. The program 404 may also include instructions to introduce a fractional time delay Δ into an output signal y(t) of the microphone array so that: $y(t+\Delta)=x(t+\Delta)*b_0+x(t-1+\Delta)*b_1+x(t-2+\Delta)*b_2+\ldots+x(t-N+\Delta)b_N$, where Δ is between zero and ±1.

Figure 5:
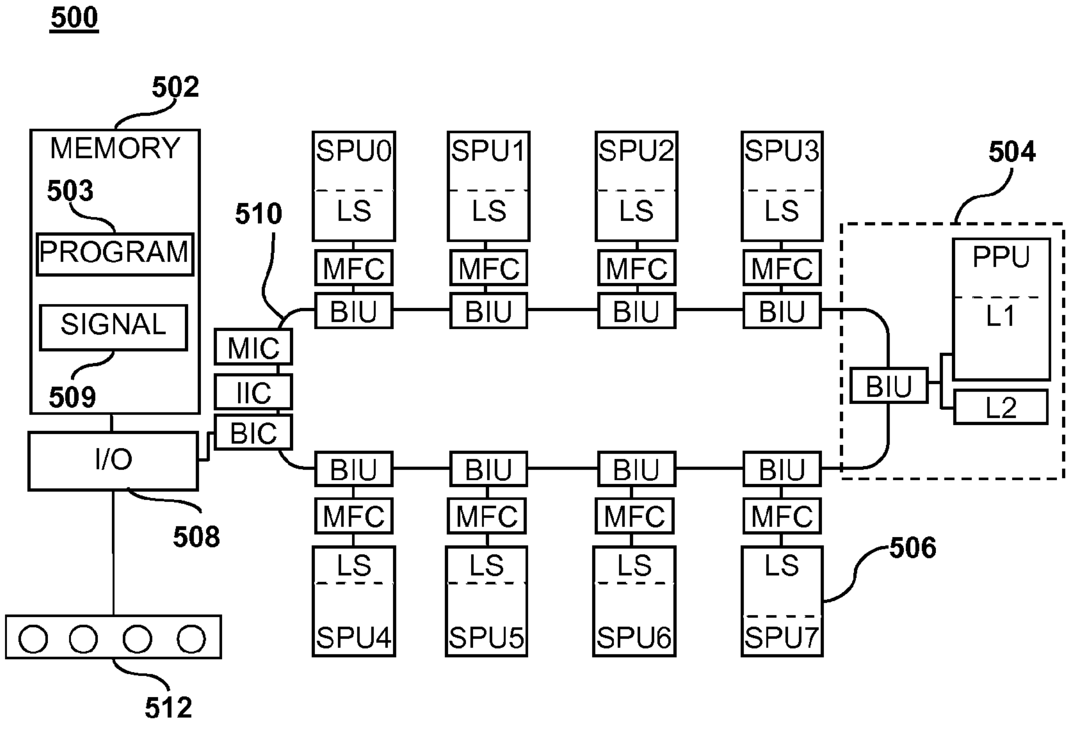
FIG. 5 is a block diagram of a cell processor implementation of a signal processing system according to an embodiment of the present invention.

By way of example, embodiments of the present invention may be implemented on parallel processing systems. Such parallel processing systems typically include two or more processor elements that are configured to execute parts of a program in parallel using separate processors. By way of example, and without limitation, FIG. 5 illustrates a type of cell processor 500 according to an embodiment of the present invention. The cell processor 500 may be used as the processor 401 of FIG. 4. In the example depicted in FIG. 5, the cell processor 500 includes a main memory 502, power processor element (PPE) 504, and a number of synergistic processor elements (SPEs) 506. In the example depicted in FIG. 5, the cell processor 500 includes a single PPE 504 and eight SPE

506. In such a configuration, seven of the SPE 506 may be used for parallel processing and one may be reserved as a back-up in case one of the other seven fails. A cell processor may alternatively include multiple groups of PPEs (PPE groups) and multiple groups of SPEs (SPE groups). In such a case, hardware resources can be shared between units within a group. However, the SPEs and PPEs must appear to software as independent elements. As such, embodiments of the present invention are not limited to use with the configuration shown in FIG. 5.

The main memory 502 typically includes both general-purpose and nonvolatile storage, as well as special-purpose hardware registers or arrays used for functions such as system configuration, data-transfer synchronization, memory-mapped I/O, and I/O subsystems. In embodiments of the present invention, a signal processing program 503 and a signal 509 may be resident in main memory 502. The signal processing program 503 may be configured as described with respect to FIG. 3 above. The signal processing program 503 may run on the PPE. The program 503 may be divided up into multiple signal processing tasks that can be executed on the SPEs and/or PPE.

By way of example, the PPE 504 may be a 64-bit PowerPC Processor Unit (PPU) with associated caches L1 and L2. The PPE 504 is a general-purpose processing unit, which can access system management resources (such as the memory-protection tables, for example). Hardware resources may be mapped explicitly to a real address space as seen by the PPE. Therefore, the PPE can address any of these resources directly by using an appropriate effective address value. A primary function of the PPE 504 is the management and allocation of tasks for the SPEs 506 in the cell processor 500.

Although only a single PPE is shown in FIG. 5, some cell processor implementations, such as cell broadband engine architecture (CBEA), the cell processor 500 may have multiple PPEs organized into PPE groups, of which there may be more than one. These PPE groups may share access to the main memory 502. Furthermore the cell processor 500 may include two or more groups SPEs. The SPE groups may also share access to the main memory 502. Such configurations are within the scope of the present invention.

Each SPE 506 is includes a synergistic processor unit (SPU) and its own local storage area LS. The local storage LS may include one or more separate areas of memory storage, each one associated with a specific SPU. Each SPU may be configured to only execute instructions (including data load and data store operations) from within its own associated local storage domain. In such a configuration, data transfers between the local storage LS and elsewhere in a system 500 may be performed by issuing direct memory access (DMA) commands from the memory flow controller (MFC) to transfer data to or from the local storage domain (of the individual SPE). The SPUs are less complex computational units than the PPE 504 in that they do not perform any system management functions. The SPU generally have a single instruction, multiple data (SIMD) capability and typically process data and initiate any required data transfers (subject to access properties set up by the PPE) in order to perform their allocated tasks. The purpose of the SPU is to enable applications that require a higher computational unit density and can effectively use the provided instruction set. A significant number of SPEs in a system managed by the PPE 504 allow for cost-effective processing over a wide range of applications.

Each SPE 506 may include a dedicated memory flow controller (MFC) that includes an associated memory management unit that can hold and process memory-protection and access-permission information. The MFC provides the primary method for data transfer, protection, and synchronization between main storage of the cell processor and the local storage of an SPE. An MFC command describes the transfer to be performed. Commands for transferring data are sometimes referred to as MFC direct memory access (DMA) commands (or MFC DMA commands).

Each MFC may support multiple DMA transfers at the same time and can maintain and process multiple MFC commands. Each MFC DMA data transfer command request may involve both a local storage address (LSA) and an effective address (EA). The local storage address may directly address only the local storage area of its associated SPE. The effective address may have a more general application, e.g., it may be able to reference main storage, including all the SPE local storage areas, if they are aliased into the real address space.

To facilitate communication between the SPEs 506 and/or between the SPEs 506 and the PPE 504, the SPEs 506 and PPE 504 may include signal notification registers that are tied to signaling events. The PPE 504 and SPEs 506 may be coupled by a star topology in which the PPE 504 acts as a router to transmit messages to the SPEs 506. Alternatively, each SPE 506 and the PPE 504 may have a one-way signal notification register referred to as a mailbox. The mailbox can be used by an SPE 506 to host operating system (OS) synchronization.

The cell processor 500 may include an input/output (I/O) function 508 through which the cell processor 500 may interface with peripheral devices, such as a microphone array 512. In addition an Element Interconnect Bus 510 may connect the various components listed above. Each SPE and the PPE can access the bus 510 through a bus interface units BIU. The cell processor 500 may also includes two controllers typically found in a processor: a Memory Interface Controller MIC that controls the flow of data between the bus 510 and the main memory 502, and a Bus Interface Controller BIC, which controls the flow of data between the I/O 508 and the bus 510. Although the requirements for the MIC, BIC, BIUs and bus 510 may vary widely for different implementations, those of skill in the art will be familiar their functions and circuits for implementing them.

The cell processor 500 may also include an internal interrupt controller IIC. The IIC component manages the priority of the interrupts presented to the PPE. The IIC allows interrupts from the other components the cell processor 500 to be handled without using a main system interrupt controller. The IIC may be regarded as a second level controller. The main system interrupt controller may handle interrupts originating external to the cell processor.

In embodiments of the present invention, the fractional delays described above may be performed in parallel using the PPE 504 and/or one or more of the SPE 506. Each fractional delay calculation may be run as one or more separate tasks that different SPE 506 may take as they become available.

Embodiments of the present invention may utilize arrays of between about 2 and about 8 microphones in an array characterized by a microphone spacing d between about 0.5 cm and about 2 cm. The microphones may have a dynamic range from about 120 Hz to about 16 kHz. It is noted that the introduction of fractional delays in the output signal y(t) as described above allows for much greater resolution in the source separation than would otherwise be possible with a digital processor limited to applying discrete integer time delays to the output signal. It is the introduction of such fractional time delays that allows embodiments of the present invention to achieve high resolution with such small microphone spacing and relatively inexpensive microphones.

Embodiments of the invention may also be applied to ultrasonic position tracking by adding an ultrasonic emitter to the microphone array and tracking objects locations through analysis of the time delay of arrival of echoes of ultrasonic pulses from the emitter.

Although for the sake of example the drawings depict linear arrays of microphones embodiments of the invention are not limited to such configurations. Alternatively, three or more microphones may be arranged in a two-dimensional array, or four or more microphones may be arranged in a three-dimensional. In one particular embodiment, a system based on 2-microphone array may be incorporated into a controller unit for a video game.

Signal processing systems of the present invention may use microphone arrays that are small enough to be utilized in portable hand-held devices such as cell phones personal digital assistants, video/digital cameras, and the like. In certain embodiments of the present invention increasing the number of microphones in the array has no beneficial effect and in some cases fewer microphones may work better than more. Specifically a four-microphone array has been observed to work better than an eight-microphone array.

Embodiments of the present invention may be used as presented herein or in combination with other user input mechanisms and notwithstanding mechanisms that track or profile the angular direction or volume of sound and/or mechanisms that track the position of the object actively or passively, mechanisms using machine vision, combinations thereof and where the object tracked may include ancillary controls or buttons that manipulate feedback to the system and where such feedback may include but is not limited light emission from light sources, sound distortion means, or other suitable transmitters and modulators as well as controls, buttons, pressure pad, etc. that may influence the transmission or modulation of the same, encode state, and/or transmit commands from or to a device, including devices that are tracked by the system and whether such devices are part of, interacting with or influencing a system used in connection with embodiments of the present invention.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for digitally processing a signal from an array of two or more microphones $M_0 \ldots M_M$, the method comprising:

producing a discrete time domain input signal $x_m(t)$ at a runtime from each of the two or more microphones $M_0 \ldots M_M$, where M is greater than or equal to 1;

determining a listening direction of the microphone array with a digital signal processing system having a digital processor coupled to a memory by forming analysis frames of a pre-recorded signal stored in the memory from a source located in a preferred known listening direction with respect to the microphone array for a predetermined period of time at predetermined intervals using the processor, transforming the analysis frames into the frequency domain using the processor, estimating a calibration covariance matrix from vectors formed from the analysis frames that have been transformed into the frequency domain using the processor, computing an eigenmatrix of the calibration covariance matrix, and computing an inverse of the eigenmatrix;

using the known listening direction in a semi-blind source separation implemented by the processor to select a set of N finite impulse response filter coefficients $b_i$, where N is a positive integer.

2. The method of claim 1 wherein using the listening direction in a semi-blind source separation includes:

transforming each input signal $x_m(t)$ to a frequency domain to produce a frequency domain input signal vector for each of k=0:N frequency bins;

generating a runtime covariance matrix from each frequency domain input signal vector;

multiplying the runtime covariance matrix by the inverse of the eigenmatrix to produce a mixing matrix;

generating a mixing vector from a diagonal of the mixing matrix;

multiplying an inverse of the mixing vector by the frequency domain input signal vector to produce a vector containing independent components of the frequency domain input signal vector.

3. The method of claim 1, further comprising applying one or more fractional delays to one or more of the time domain input signals $x_m(t)$ other than an input signal $x_0(t)$ from a reference microphone $M_0$, wherein each fractional delay is selected to optimize a signal to noise ratio of a discrete time domain output signal y(t) from the microphone array and wherein the fractional delays are selected to such that a signal from the reference microphone $M_0$ is first in time relative to signals from the other microphone(s) of the array.

4. The method of claim 3 wherein the fractional delay is greater than a minimum delay, wherein the minimum delay is long enough to capture reverberation from the signal.

5. The method of claim 1, further comprising introducing a fractional time delay Δ into the output signal y(t) so that: $y(t+\Delta)=x(t+\Delta)*b_0+x(t-1+\Delta)*b_1+x(t-2+\Delta)*b_2+\ldots+x(t-N+\Delta)*b_N$, where Δ is between zero and ±1, and where $b_0$, $b_1$, $b_2 \ldots$, $b_N$ are the finite impulse response filter coefficients $b_i$, where the symbol "*" represents the convolution operation.

6. The method of claim 5 further comprising determining values of the impulse response functions $b_i$ that best separate two or more sources of sound from the input signals $x_m(t)$.

7. The method of claim 5 wherein neighboring microphones in the microphone array are separated from each other by a distance of less than about 4 centimeters.

8. The method of claim 7 wherein neighboring microphones in the microphone array are separated from each other by a distance of between about 1 centimeter and about 2 centimeters.

9. The method of claim 5 wherein the microphones $M_0 \ldots M_M$ are characterized by a maximum response frequency of less than about 16 kilohertz.

10. The method of claim 5 wherein the microphones $M_0 \ldots M_M$ are characterized by a maximum response frequency of less than about 16 kilohertz and wherein neighboring microphones in the microphone array are separated from each other by a distance of less than about 4 centimeters.

11. The method of claim 5 wherein the microphones $M_0 \ldots M_M$ are characterized by a maximum response frequency of less than about 16 kilohertz and wherein neighboring microphones in the microphone array are separated from each other by a distance of between about 0.5 centimeter and about 2 centimeters.

12. The method of claim 5, wherein introducing a fractional time delay $\Delta$ into the output signal y(t) includes:

delaying each time domain input signal $x_m(t)$ by j+1 frames, where j is greater than or equal to 1; and transforming each input signal $x_m(t)$ to a frequency domain to produce a frequency domain input signal vector $X_{jk}$ for each of k=0:N frequency bins, such that there are N+1 frequency bins.

13. The method of claim 12, further comprising determining values of filter coefficients for each microphone m, each frame j and each frequency bin k, $b_{jk}=[b_{0j}(k), b_{1j}(k), b_{2j}(k), b_{3j}(k)]$ that best separate out two or more sources of sound from the input signals $x_m(t)$.

14. The method of claim 13 wherein determining the listening direction includes:

recording a signal from a source located in a preferred listening direction with respect to the microphone for a predetermined period of time;

forming analysis frames of the signal at predetermined intervals;

transforming the analysis frames into the frequency domain;

estimating a calibration covariance matrix from a vector of the analysis frames that have been transformed into the frequency domain;

computing an eigenmatrix of the calibration covariance matrix; and computing an inverse of the eigenmatrix and wherein determining the values of filter coefficients for each microphone m, each frame j and each frequency bin k, $b_{jk}$ includes:

generating a runtime covariance matrix from each frequency domain input signal vector $X_{jk}$;

multiplying the runtime covariance matrix by the inverse of the eigenmatrix to produce a mixing matrix;

generating a mixing vector from a diagonal of the mixing matrix; and determining the values of $b_{jk}$ from one or more components of the mixing vector.

15. The method of claim 1 wherein the two or more microphones $M_0 \ldots M_M$ are omni-directional microphones.

16. A signal processing apparatus, comprising:

an array of two or more microphones $M_0 \ldots M_M$ wherein each of the two or more microphones is adapted to produce a discrete time domain input signal $x_m(t)$ at a runtime;

one or more processors coupled to the array of two or more microphones; and a memory coupled to the array of two or more microphones and the processor, the memory having embodied therein a set of processor readable instructions configured to implement a method for digitally processing a signal, the processor readable instructions including:

one or more instructions for determining a listening direction of the microphone array from the discrete time domain input signals $x_m(t)$ by forming analysis frames of a pre-recorded a signal from a source located in a preferred known listening direction with respect to the microphone array for a predetermined period of time at predetermined intervals, transforming the analysis frames into the frequency domain, estimating a calibration covariance matrix from vectors formed from the analysis frames that have been transformed into the frequency domain, computing an eigenmatrix of the calibration covariance matrix, and computing an inverse of the eigenmatrix; and one or more instructions for using the known listening direction in a semi-blind source separation to select filtering functions to separate out two or more sources of sound from the discrete time domain input signals $x_m(t)$.

17. The apparatus of claim 16, wherein the processor readable instructions further include one or more instructions for applying one or more fractional delays to one or more of the time domain input signals $x_m(t)$ other than an input signal $x_0(t)$ from a reference microphone $M_0$, wherein each fractional delay is selected to optimize a signal to noise ratio of a discrete time domain output signal y(t) from the microphone array and wherein the fractional delays are selected to such that a signal from the reference microphone $M_0$ is first in time relative to signals from the other microphone(s) of the array.

18. The apparatus of claim 16 wherein the processor readable instructions further include one or more instructions for introducing a fractional time delay $\Delta$ into the output signal y(t) so that: $y(t)=x(t)*b_{0+x(t-}1+\Delta)*b_1+x(t-2+\Delta)*b_2\Delta \ldots + x(t-N+\Delta)*b_N$, where $\Delta$ is between zero and ±1, and where $b_0, b_1, b_2 \ldots, b_N$ are finite impulse response filter coefficients, where the symbol "*" represents the convolution operation.

19. The apparatus of claim 18 wherein the one or more instructions for introducing a fractional time delay $\Delta$ into the output signal y(t) include:

one or more instructions for delaying each time domain input signal $x_m(t)$ by j+1 frames, where j is greater than or equal to 1; and transforming each input signal $x_m(t)$ to a frequency domain to produce a frequency domain input signal vector $X_{jk}$ for each of k=0:N frequency bins, such that there are N+1 frequency bins.

20. The apparatus of claim 18 wherein neighboring microphones in the microphone array are separated from each other by a distance of less than about 4 centimeters.

21. The apparatus of claim 20 wherein neighboring microphones in the microphone array are separated from each other by a distance of between about 1 centimeter and about 2 centimeters.

22. The apparatus of claim 18 wherein the microphones $M_0 \ldots M_M$ array are characterized by a maximum response frequency of less than about 16 kilohertz.

23. The apparatus of claim 18 wherein the microphones $M_0 \ldots M_M$ array are characterized by a maximum response frequency of less than about 16 kilohertz and wherein neighboring microphones in the microphone array are separated from each other by a distance of less than about 4 centimeters.

24. The apparatus of claim 18 wherein the microphones $M_0 \ldots M_M$ array are characterized by a maximum response frequency of less than about 16 kilohertz and wherein neighboring microphones in the microphone array are separated from each other by a distance of between about 1 centimeter and about 2 centimeters.

25. The apparatus of claim 16 wherein the two or more microphones $M_0 \ldots M_M$ are omni-directional microphones.

26. The apparatus of claim 16 wherein the one or more processors include a power processor element (PPE) and one or more synergistic processor elements (SPE) of a cell processor.

27. A method for digitally processing a signal from an array of two or more microphones $M_0 \ldots M_M$, the method comprising:

receiving an audio signal at each of the two or more microphones $M_0 \ldots M_M$;

producing a discrete time domain input signal $x_m(t)$ at a runtime from each of the two or more microphones $M_0 \ldots M_M$;

determining a listening direction of the microphone array with a digital signal processing system having a digital processor by forming analysis frames of a pre-recorded a signal from a source located in a preferred known listening direction with respect to the microphone array for a predetermined period of time at predetermined intervals using the processor, transforming the analysis frames into the frequency domain using the processor, estimating a calibration covariance matrix from vectors formed from the analysis frames that have been transformed into the frequency domain using the processor, computing an eigenmatrix of the calibration covariance matrix using the processor, and computing an inverse of the eigenmatrix using the processor applying one or more fractional delays to one or more of the time domain input signals $x_m(t)$ other than an input signal $x_0(t)$ from a reference microphone $M_0$ using the processor, wherein each fractional delay is selected to optimize a signal to noise ratio of an output signal from the microphone array and wherein the fractional delays are selected to such that a signal from the reference microphone $M_0$ is first in time relative to signals from the other microphone(s) of the array.

28. The method of claim 27 wherein the fractional delay is greater than a minimum delay, wherein the minimum delay is long enough to capture reverberation from the signal.

29. The method of claim 27 wherein the two or more microphones $M_0 \ldots M_M$ are omni-directional microphones.

* * * * *